BEST AVAILABLE COPY
E. Lester,
Pattern for Casting.
No. 617 x
Patented May 10, 1805.
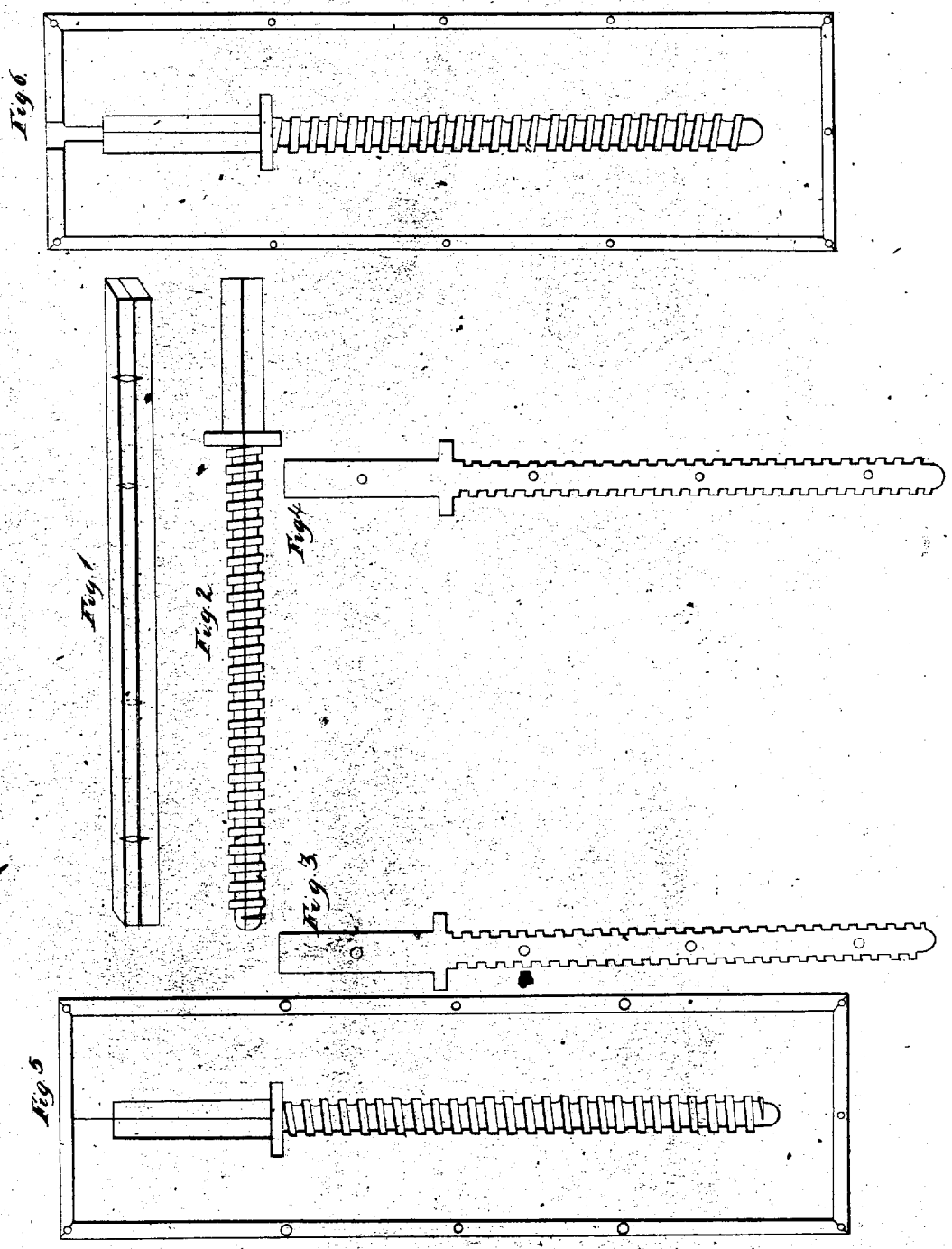
N. PETERS, PHOTO-LITHOGRAPHER, WASHINGTON, D. C.

617X. Ebenezer Lester

Letters Patent

The Schedule referred to in these Letters Patent and making part of the same containing a description in the words of the said Ebenezer Lester himself of his method of making moulds for casting iron screws of any dimensions.

Take two pieces of fine grained well seasoned hard timber: each of the length of the screw intended, and of a corresponding thickness as for instance for a screw four feet long. Take two pieces of timber of the quality aforesaid, each four feet long, two and one half inches thick and four and one half inches wide, lay them together with a close joint; then fasten in each piece two pins each of one inch in length, then bore holes in each piece to receive the projecting pins. then fasten the pieces together and reduce them to three inches diameter for two feet and a half in length. then reduce the square to four inches square for ten inches in length and reduce also the other eight inches to a point from the square then the part on which the screw is to be cut being two and one half feet in length must be made perfectly smooth and round, then cut the screw half an inch wide, and three eighths of an inch deep, leaving the space of the same width as the worm or thread and also leaving the thread about the two and thirtieth part of an inch bevelling. then take two boxes made of boards. each five feet long fourteen inches wide and one foot deep. fill them with the best of sand then take the mould part prepared as aforesaid and mould one half in each box, with perfect exactness then put the boxes together leaving a hole in the upper box at the lower end of the square of the square of the screw to run the metal in at. and the mould is completed. Thus by taking parts in proportion to the above any screw of similar dimensions may be cast. and by varying the proportions. Screws of any dimensions may be cast Witness { William [illegible]
Walter Firth (361 words) ([illegible] May [illegible])

Ebenezer Lester

[illegible]